Figure 2:
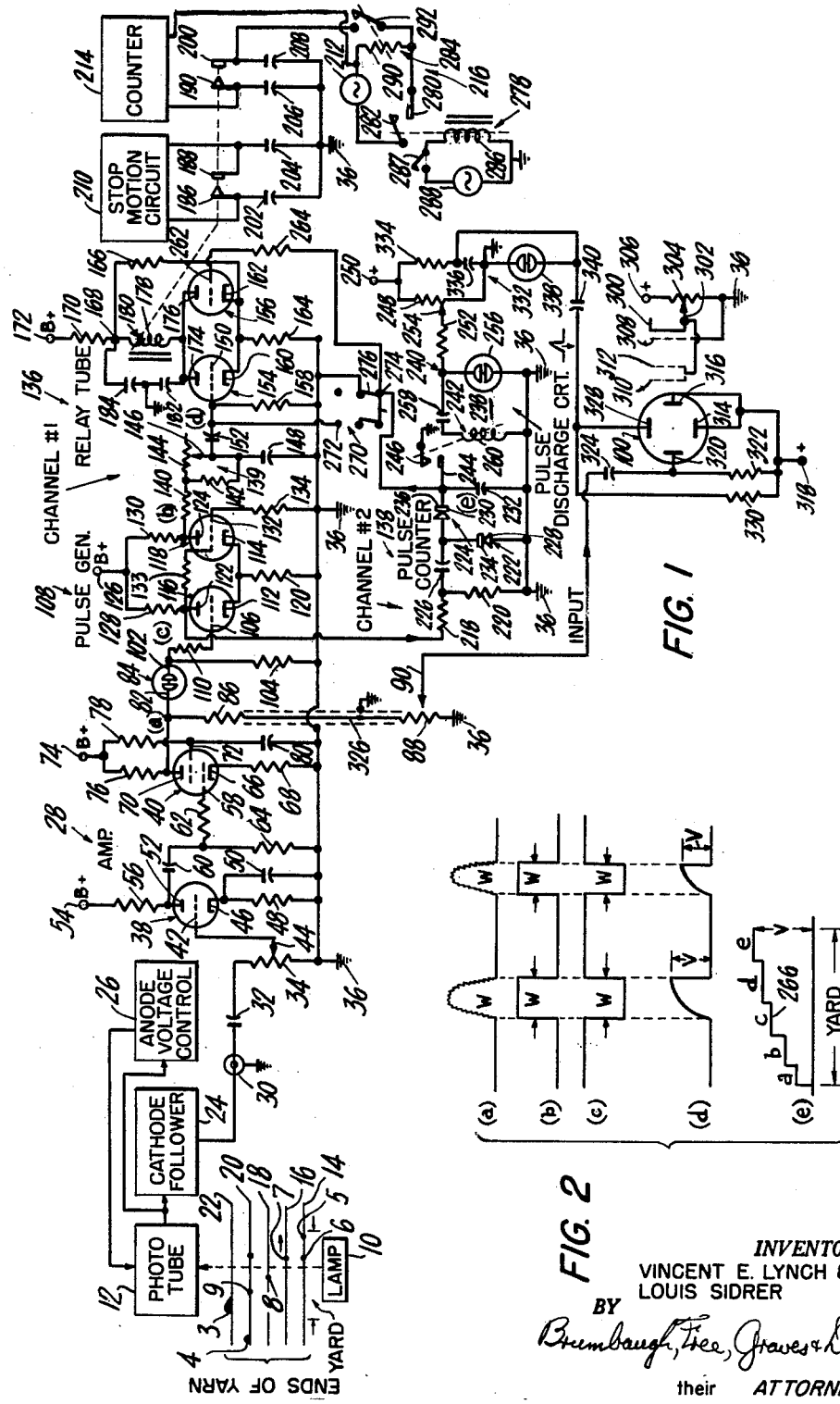

March 10, 1964  V. E. LYNCH ETAL  3,124,289
DETECTION SYSTEM
Filed Aug. 10, 1961

FIG. I

INVENTORS.
VINCENT E. LYNCH &
LOUIS SIDRER
BY
Brumbaugh, Free, Graves & Donohue
their ATTORNEYS

United States Patent Office 3,124,289
Patented Mar. 10, 1964

3,124,289
DETECTION SYSTEM
Vincent E. Lynch, South Huntington, and Louis Sidrer, Brooklyn, N.Y., assignors, by mesne assignments, to Instrument Systems Corporation, Westbury, N.Y., a corporation of New York
Filed Aug. 10, 1961, Ser. No. 130,675
18 Claims. (Cl. 226—1)

This invention relates to detection systems for monitoring material as it is passed through a processing machine, and more particularly to a detection system which is responsive to the mass of defects which occur in the material, and to the quantity of defects which occur in a preselected length of the material.

Control systems of the type described, for example, in Patent No. 2,982,860, are designed to monitor or sample a material being processed and to turn off the drive for the processing machine or to sound an alarm in the event that a suitable defect in the material appears. This is accomplished by passing the material being processed by the machine between or transverse to a light source and a photomultiplier tube and making the drive for the processing machine responsive to variations in the current output of the photomultiplier tube.

In certain applications of these control systems, for example, where the system is employed to monitor warp yarn, it is preferred that the system be unresponsive to minor variations or defects in the material and to spurious signals, such as noise and false signals caused by the jumping or twisting of the yarn as it is moved past the light source; and it is also preferred that the system be responsive to defects with substantial mass and to defects which may have lesser mass, but which occur together over a small length of the material being monitored.

Accordingly, it is the purpose of the present invention to provide a detection system for inspecting material being processed that is responsive to defects or variations in the material having preselected mass or which are convertible to pulses with a predetermined pulse duration and which is responsive to the quantity of defects which occur over a preselected period of time or within a preselected length of the material being inspected. This is accomplished in a representative embodiment of the invention by providing electrical circuits that are responsive to voltage signals appearing on the anode of a photomultiplier tube due to defects or variations in the material being inspected. Of these voltage signals, only preselected ones representative of defects with substantial mass cause pulses to be generated with pulse widths dependent upon the pulse widths of the preselected voltage signals. In one channel, the pulses are converted to signals which are dependent upon the pulse widths of said pulses. These signals are applied to a circuit that is responsive to preselected ones of the signals representative of defects with preselected mass to control an electrical drive circuit of the processing machine and to record the instances when the defects result in rendering the drive circuit for the material inoperative.

In another channel, the quantity of defects which occur in a preselected period of time or over a preselected length of the material being sampled is transformed into a composite pulse which is applied to a circuit which is responsive also to preselected ones of the composite pulses for controlling the drive circuit for the processing machine and for recording the instances when the processing machine is rendered inoperative as previously mentioned. Thus, the detection system of the invention provides means for monitoring the mass of defects occurring in the material being processed and means for monitoring the quantity of defects occurring in the material being processed depending on the quantity of defects occurring over a given length of the material.

This invention may be more completely understood from the following detailed description taken in conjunction with the accompanying figures of the drawing, in which:

FIGURE 1 is a schematic diagram of an exemplary embodiment of a detection system constructed in accordance with the invention; and FIGURE 2 is a schedule of wave forms for the detection system shown in FIGURE 1.

Referring to FIGURE 1, there is shown a schematic diagram of the detection system of the invention operably connected, for example, to a photomultiplier control circuit such as disclosed in the aforementioned patent. A lamp 10 is disposed in spaced-apart relation to a photomultiplier tube 12 and functions as the light source of the detection system. The lamp 10 is mounted with its filament disposed in a vertical plane or perpendicular to the plane in which a plurality of ends of yarn 14–22 are driven intermediate the lamp 10 and the photomultiplier tube 12. Preferably the spacing between the lamp 10 and the tube 12 is such that the image of the filament is blurred so that the image of the filament does not energize the photomultiplier tube 12. The photomultiplier tube 12 is responsive to illumination from the lamp 10 and the output at the anode thereof is connected to a cathode follower 24 and to an anode voltage control circuit 26, which may, in accordance with the aforementioned patent for example, include an integrating network for controlling the anode voltage of the photomultiplier tube 12 due to changes in the sensitivity of the photomultiplier tube 12 as distinguished from signal pulses having durations of the order of microseconds resulting from variations, defects, or flaws in a plurality of ends of yarn moved in a direction perpendicular to the light beam generated by the lamp 10.

The output of the cathode follower 24 is coupled to a two-stage linear amplifier 28 through an input connector 30, a coupling capacitor 32 and a variable resistor 34 connected to electrical ground 36. Thus, the signal voltage input to the detector system of the invention corresponds, for example, to the signal voltage input to the detector sysem of the aforementioned patent.

The amplifier 28 consists of a triode tube 38 and a tetrode tube 40. A control grid 42 of the triode 38 is connected to the wiper arm 44 of the variable resistor 34. A cathode 46 is connected to ground through a load resistor 48 and a bypass capacitor 50 is shunt connected across the cathode resistor 48. An anode 52 of the triode is connected to a B+ supply 54 through a load resistor 56. Amplified signals appearing at the anode 52 are coupled to a control grid 58 of the tetrode 40 through a coupling capacitor 60 and a resistor 62. The control grid 58 is also connected to ground 36 through a resistor 64 connected to the junction of the coupling capacitor 60 and the resistor 62. A cathode 66 of the tetrode 40 is connected to ground 36 through a cathode resistor 68. An anode 70 and a screen grid 72 are connected to a B+ supply 74, respectively, through resistors 76 and 78 and the screen grid 72 is connected to ground 36 through a bypass capacitor 80. Amplified positive-going signals (waveform (a) in FIG. 2) appearing at the anode 70 of the tetrode, having pulse widths proportional to the voltage signals of the photomultiplier tube 12 are connected electrically to one terminal 82 of a neon lamp 84, which is connected to ground through a resistor 86 and a variable resistor 88 connected in series with each other. The wiper arm 90 of the variable resistor 88 is connected to a cathode-ray tube 100 for purposes to be described more fully subsequently.

Another terminal 102 of the neon lamp 84 is connected to ground 36 through a resistor 104 and to a control grid 106 of a pulse generator 108 through a resistor 110. The neon lamp 84 is used to control the periods that the detection system is responsive to the voltage signals developed by the photomultiplier tube 12. Stated otherwise, the neon lamp 84 is used to control the periods that the detection circuit is energizable by defects occurring in the ends of yarn 14–22 which are moved relative to the light waves from the lamp 10. Specifically, the neon lamp 84 is used to prevent the detection system from being energized by spurious noise signals. To this end, since the neon lamp 84 fires when the voltage across its terminals 82 and 102 is about 62.5 volts, the output of the tetrode 40 is selected to trigger the neon lamp 84 when defects 3 and 4 have a substantial vertical-rising mass, as distinguished from spurious noise signals and false signals due to movement of the yarn in its travel path.

The pulse generator 108 consists of a duo-triode connected electrically as a Schmitt amplifier. Cathodes 112 and 114 of triodes 116 and 118 are connected together and are connected to ground 36 through a common load resistor 120. Anodes 122 and 124 are connected, respectively, to a B+ supply 126 through load resistors 128 and 130. Output signals appearing at the anode 122 of the triode 116 are connected to a control grid 132 of the normally conducting triode 118 of the amplifier 108. The control grid 132 is connected also to ground 36 through a bias resistor 134. The anode 122 of the triode 116 is connected also to the defect-counter circuit in channel #2 of the detection system. The pulse generator 108 and a relay tube 136, described subsequently, comprise a mass-detector circuit in channel #1.

In the Schmitt amplifier 108 the triode 118 is normally conducting while the triode 116 is non-conducting. When the neon lamp 84 is triggered, the triode 116 becomes conducting and negative-going square waves (waveform (c) in FIG. 2), having pulse widths proportional to the voltage signals of the photomultiplier tube 12, are coupled to a pulse counter circuit 138 in channel #2. Similarly, positive-going square waves (waveform (b) in FIG. 2), having pulse widths proportional to the photomultiplier tube 12 signals, which appear at the anode 124 of the triode 118, are coupled to an integrating circuit 139 to derive signals having amplitudes proportional to the pulse widths of the photomultiplier signals for controlling the periods that the relay tube 136 is energized.

Considering the circuit of channel #1 first, resistors 140 and 142 and variable resistor 144, the wiper arm 146 of which is connected to one terminal of the resistor 142 and to one side of a capacitor 148, which is connected to ground 36 at the other side thereof, form the integrating circuit 139. Sawtooth pulses (waveform (d) in FIG. 2) appearing across the capacitor 148 are coupled to a control grid 150 of the relay tube 136 through a capacitor 152.

The relay tube 136 consists of a duo-triode and each triode 154 and 156, respectively, amplifies signals coupled to it from either channel #1 or channel #2 in order to control the operation of certain electrical apparatus used in conjunction with the detection system of the invention. The control grid 150 of the triode 154 is connected to ground 36 through a bias resistor 158. Cathodes 160 and 162 are connected together and to ground 36 through a common resistor 164. A positive bias voltage is connected to the cathodes 160 and 162 through a resistor 166, connected at one terminal thereof to the cathodes and to a positive voltage at the terminal 168 of a resistor 170 connected to a B+ supply voltage 172. The wiper arm 146 is the sensitivity control for channel #1 since it controls the magnitude of the sawtooth pulses developed and coupled to the control grid 150 of the triode 154, and the triode 154 conducts only when the sawtooth pulses overcome the bias voltage at the cathode 160. Anodes 174 and 176 of the triodes 154 and 156 are connected together and are connected to the B+ supply 172 through a solenoid 178 of a relay 180 and the resistor 170. Additionally, the anodes 174 and 176 are connected to ground 36 through a filter capacitor 182; and a filter capacitor 184 is connected between one terminal of the solenoid 178 and ground 36 to prevent energization of the relay by spurious signals, and to suitably delay relay action.

When the triode 154 conducts, the relay 180 becomes energized and two pairs of contacts 186—188 and 190—200 thereof are closed. Each of the contacts 186—188 and 190—200 are connected to ground respectively, through filter capacitors 202—208 which remove spurious voltages developed during the switching of the contacts. Additionally, the pair of contacts 186—188 is connected to a stop-motion circuit 210 of the warper, which may take any suitable conventional form capable of shutting down the electrical drive circuit by which the plurality of ends of yarn 14–22 are moved past the light rays generated in the detection system. Simultaneously, the pair of relay contacts 190—200 close providing an A.-C. voltage from a source 212 to a counter circuit 214 for recording the periods when the drive circuit for the ends of yarn 14–22 is shut down. The A.-C. voltage supplied to the pair of contacts 190—200 is included in an 8 to 10 second delay circuit 216 to be described in detail subsequently.

In operation, the light rays from the lamp are interrupted by all defects but the neon lamp 84 is energized only when the amplifier 28 output is about 62.5 volts so that defects with lesser pulse widths and false indications of defects do not energize the stop-motion 210 or counter 214 circuits of the system. The signals which cause the neon lamp 84 to trigger and which are representative of defects with substantial vertical-rising mass are converted into square-waves (waveforms b and c) having widths proportional to the pulse widths of these defects by the pulse generator 128. The square-waves are integrated to produce sawtooth waves (waveform d) having amplitudes proportional to the width of the square waves and the sawtooth waves are coupled to the relay tube 136. Depending on the setting of the wiper arm 146, only those pulses having sufficient amplitudes or which are representative of defects with a preselected pulse width and mass energize the relay tube 136 which in turn activates the relay 180 to stop the electrical drive circuit for the moving ends of yarn so that a defect or defects, such as defects 3 and 4, in the ends of yarn 20 and 22 can cause the drive circuit to be stopped so that the ends of yarn can be inspected and removed by personnel attending to the warper machine. The counter 214 circuit is also energized by the relay 180 to record the number of times that the drive circuit is de-energized which can be used as an indication of the quality of the yarn being monitored. Thus, the circuit described in the channel #1 detects the mass and pulse width of defects which occur in the ends of yarn.

Channel #2, on the other hand, is adapted to monitor the number of defects which occur in the ends of the yarn being monitored over a preselected period of time. Stated otherwise, in channel #2 the defects occurring over a preselected length of the ends of yarn traversing the light source 10 are scanned by a defect-counter circuit. Thus, in channel #2, signals representative of defects with substantially large mass or pulse width are not as important as the number or quantity of defects which occur in a preselected length of the ends of yarn traversing the light source, although all voltage signals which cause the neon lamp 84 to trigger are monitored.

As previously mentioned the negative-going square waves (waveform (c) FIG. 2) produced at the anode 122 of the triode 116 are coupled electrically to a pulse counter circuit 138 in channel #2. A resistor 218, connected to a resistor 220, which is connected to the ground 36, together form a voltage divider. A portion of the voltage developed across the resistor 220 is coupled through a capacitor 226 to two crystal diodes 222 and 224. The cathode 228 of the diode 222 is connected to the ground 36 and the anode 230 of the diode 224 is connected to one side of a collector capacitor 232, the other side of which is connected to the ground 36. The anode 234 of the diode 222 and the cathode 236 of the diode 224 are connected together and to one side of the coupling capacitor 226. The collector capacitor 232 is charged by the flow of current through the diode 224 which corresponds to the periods when the negative-going square waves (waveform c) are produced at the anode 122 of the triode 116 of the pulse generator 108.

A pulse discharge circuit 238 is included to discharge the collector capacitor 232 after a preselected period of time or as stated previously after a preselected length of yarn has traversed the light source 10. The pulse discharge circuit 238 comprises a sawtooth pulse oscillator 240 and an electro-mechanical chopper 242 having a fixed contact 244 and a movable contact 246. The fixed contact 244 is connected to the side of the collector capacitor 232 which is charged through the diode 224. The movable contact 246 is connected to ground 36 so that the collector capacitor 232 is shorted electrically to ground when the chopper 238 is energized. The sawtooth pulse oscillator 240 comprises a variable resistor 248, one terminal of which is connected to a positive supply voltage 250, a resistor 252 connected to wiper arm 254 thereof, and a neon lamp 256, connected between the other terminal of resistor 252 and to the ground 36. A capacitor 258, one side of which is connected to the resistor 252 and to the terminal of the neon lamp 256, and the other side of which is connected to the grounded terminal of a solenoid 260 of the chopper 242, is charged from the positive supply voltage 250 through the variable resistor 248 and the resistor 252. The neon lamp 256 is adapted to be triggered when the capacitor 258 charges to about 62.5 volts. The setting of the wiper arm 254 controls the rate at which the capacitor 258 is charged, and therefore, controls the number of times that the neon lamp 256 is triggered. When the neon lamp 256 is triggered, the capacitor 258 discharges through the solenoid 260 and the movable contact 246 of the chopper 242 contacts the fixed contact 244 discharging the collector capacitor 232. When the collector capacitor is discharged, a control grid 262 of the triode 156 of the relay tube 136 is grounded. At intermediate times, voltage signals (waveform (e) in FIG. 2) proportional to the charge across the collector capacitor 232 are coupled to the control grid 262 through a resistor 264. Thus, the wiper arm 254 controls the rate at which the collector capacitor 232 is discharged, and therefore, the length of the ends of yarn monitored in channel #2 in a preselected period of time.

The triode 156 of the relay tube 136 is adapted to become energized and in turn to cause the relay 180 to become energized in the same manner indicated for the triode 154 in channel #1 when the collector capacitor 232 has charged to a sufficient level, whereby the cathode bias on the triode 156 is overcome.

In the preferred embodiment of the invention, the pulse discharge circuit 238 is adapted to discharge the collector capacitor 8 to 10 times per second, depending on the setting of wiper arm 254, which may be equivalent to monitoring or sampling every yard of the ends of yarn traversing the light source 10 if the ends of yarn 14–22 are driven past the light source 10 at a speed of 600 yards per minute or 10 yards per second. Therefore, of those defects which occur in each yard of the ends of yarn and which result in signals (waveform (a) in FIG. 2) having amplitudes of sufficient magnitude to cause the neon lamp 84 to become energized, only signals representative of a plurality of defects such as 3, and 5–9 in one yard of the ends of yarn 14–22 result in charging the collector capacitor 232 to a sufficient level for overcoming the cathode bias on the triode 156 of the relay tube 136 before the collector capacitor 232 is discharged by the chopper 242. However, contrary to the operation of channel #1, the charge stored by the collector capacitor 232 is a composite signal 266 representative of all defects which cause the neon lamp 84 to be triggered and which occur in each yard of the ends of yarn during the charging time of the collector capacitor 232 irrespective of their individual mass or form. The relay 180 may be energized by the composite signal 266 if it has sufficient amplitude to energize the triode 156.

In wave form (e), step a of the composite signal 266 is representative of the defect 5 in the yarn 14 and step b is representative of the larger mass of the defects 6 and 7 in the yarns 14 and 16 since the defects, as shown, are aligned with one another in a vertical direction so that the larger mass of the two interrupts the light source 10 falling on the photomultiplier tube 12. Naturally, if the defects were not in alignment but in overlapping relation, their widths would be additive, and this would give rise to a horizontal step in the composite signal which is at least as long as the pulse width of the two corresponding pulses since the steps in the composite signal occur with the leading edge of the input pulses and remain at the resulting potential until the next succeeding pulse occurs. Similarly, steps c and d correspond to defects 8 and 9 in yarns 18 and 20 and step e corresponds to defect 3 which caused the relay tube 136 to become energized in channel #1. Thus, the cumulative effect of a plurality of defects 3, and 5–9, which are representative of "real" defects, as opposed to spurious signals or false defects, may result in charging the collector capacitor 232 to a sufficient level so that the relay 180 becomes energized and stops the electrical drive circuit 210 for the ends of yarn 14–22 and causes the counter 214 to record the instant when the drive circuit 210 is de-energized.

The charging time for the collector capacitor 232 is considerably longer than the discharge time thereof so that defect-counter circuit in channel #2 is only insensitive to input signals for a period of time corresponding to about 2 inches of each sampled yard of the ends of yarn. However, during the insensitive period, the mass-detector circuit of channel #1 is operative so that all defects of substantially large magnitude are continuously monitored, and when the likelihood of defects occurring during the insensitive period is considered, in effect the defect-counter circuit is responsive to substantially all the defects which energize the Schmitt amplifier. Additionally, the bias on the triodes 154 and 156 of the relay tube 136 is adjusted to be overcome when the neon lamp 84 is triggered by about 5 to 7 defects occurring in each yard of yarn. However, as stated previously, the relay tube 136 is energized when the charge on the collector capacitor 232 reaches a sufficient level and this occurs when 5 to 7 defects are present during the sampling period.

Therefore, in operation, the defect-counter circuit in channel #2 monitors and detects defects with smaller mass, and defects which appear to the photomultiplier tube as having small mass because the horizontal width of the defect is small, although in reality it may have a large mass. Defects with small mass include dispersements of lint and defects characterized in the art by such terms as strip backs, double ends, plucking, etc.

A double-pole double-throw switch 270 is connected electrically to the circuits of channels #1 and #2 so that the detection system can be operated with either or both of said channels. To this end, the control grid 150 of the triode 154 is connected electrically to a contact 272 of the switch 270. In a similar manner, one side of the collector capacitor 232 and the control grid 262 of the triode 156 are both connected to a contact 274 of the switch; and a movable element 276 is connected to the ground 36. When the switch 270 is connected to the control grid 150 of the triode, only the defect-counter circuit in channel #2 is operative, and when the switch 270 is connected to the control grid 262 of the triode 156, only the mass-detector circuit in channel #1 is operative. When the switch 270 is not connected to the contacts 272 and 274 both channels are operative.

An 8 to 10-second time delay circuit 216 is included in the detection system to keep the counter 214 de-energized until the electrical drive circuit for the ends of yarn reaches its normal operating speed for the reason that small defects will appear as substantially large defects when the ends of yarn are moved slowly and at speeds below their normal speed, and the ends of yarn in being started up may twist and jump, which causes false signals to be developed. A 6-volt relay 278, having a fixed contact 280 and a movable contact 282, and a thermal-delay device 284 are used to delay the A.-C. voltage applied to the fixed contact 200 of the relay 180 until the thermal-switch 284 is energized. A solenoid 286 of the relay 278 is connected to a 6-volt A.-C. source 288 (through an on-off switch 287). The movable contact 282 of the relay 278 and a resistive element 290 of the thermal-switch 284 are connected to the A.-C. source 212, which is ground at one terminal thereof, and an electrical circuit is closed when the movable contact 282 contacts the fixed contact 280. After 8 to 10 seconds the resistive element 290 becomes sufficiently heated to close a movable contact 292 of the thermal-switch 284 so that the A.-C. voltage from the source 212 is connected to the fixed contact 200 of the relay 180. Therefore, after the electrical drive circuit of the warper has reached its normal operating speed the counter 214 is adapted to be energized by the relay 180 when signals having suitable amplitudes are developed in channels #1 and/or channel #2.

The cathode-ray tube 100 is included in the detection system to monitor the defects in the ends of yarn as seen by the photomultiplier tube 12 and to monitor the operation of components of the detection system, such as the two-stage amplifier 28 and the power source for the electrical circuits of the detection system. A cathode 300 of the tube 100 is connected to the wiper arm 302 of a variable resistor 304 which is connected between a positive voltage source 306 and the ground. A control grid 308 of the tube 100 is connected to the ground 36 and the cathode 300 is connected electrically to accelerating anodes 310 and 312. One horizontal deflection plate 314 and one vertical deflection plate 316 of the tube 100 are connected to a source of positive voltage 318. Another vertical deflection plate 320 is connected to the source of positive voltage 318 through a resistor 322 and is coupled through a capacitor 324 to the wiper arm 90 of the variable resistor 88, which is connected electrically to the anode 70 of the tetrode 40 of the amplifier 28. The electrical connection between the resistor 86 connected to the anode 70 of the tetrode 40 and the variable resistor 88 may have a grounded outer sheath 326, if the variable resistor 88 is located remotely from the tetrode 40. The wiper arm 90 of the variable resistor 88 adjusts the amplitude of the output of the tetrode 40 which is coupled to the vertical deflection plate 320 of the tube 100. Another horizontal deflection plate 328, which is connected to the positive voltage source 318 through a resistor 330, is connected to a sawtooth wave sweep circuit 332. The sweep circuit 332 is comprised of resistor 334 connected at one terminal thereof to the positive voltage source 250 and connected at the other terminal thereof to a capacitor 336, the other side of which is connected to the variable resistor 248 and to one terminal of a neon lamp 338, which functions to discharge the capacitor periodically to produce sawtooth waves. Sawtooth waves produced across the capacitor 336 are coupled through a capacitor 340 to the horizontal deflection plates 314 and 328.

The cathode ray tube can be located at any convenient place for visually monitoring the defects observed by the photomultiplier tube 12 and for monitoring the operation of the detection system power supply circuits. Additionally, by observing the visual indication of defects displayed on the cathode ray tube 100, the performance of the detection system in stopping the electrical drive system can be correlated against the magnitude of pulses viewed on the screen. For example, when experience is gained an attendant observing the screen can tell that a defect occurred in an end of yarn and the defect did not result in stopping the electrical drive circuit for the warper. This may indicate that the sensitivity of the detection system requires readjustment or that some maintenance is required. The need for maintenance would also be indicated if the pulse display was reduced in amplitude from that normally expected.

The lamp 10 can also be mounted with its filament disposed in a horizontal plane or parallel to the plane in which the plurality of driven ends of yarn are driven. While the vertical placement of the lamp filament makes vertical-rising defects in the ends of yarn pronounced and aids in developing corresponding voltage signals from the photomultiplier tube 12 depending on the mass of the defects, the horizontal placement of the filament is an aid in developing voltage signals for defects which extend horizontally and which may have small mass. Thus, the lamp 10 may be placed with its filament in a horizontal position to monitor the breaks of one or more strands in each end of yarn or the pulse width of defects since in this position of the lamp horizontal defects become more pronounced for controlling the light impinging on the photomultiplier tube 12.

While a representative embodiment of the present invention has been shown and described for purposes of illustration, it is apparent that the embodiment is susceptible of change and modification without departing from the invention. For example, it is desirable that the invention not be limited by particular voltage values or pulse waveforms to utilize the voltage signals of the photomultiplier to monitor the mass of the defects or the quantity of defects, or to develop signals with particular amplitudes representative of the monitored defects to control the operation of auxiliary equipment used together with the detection system. Further, it is intended that detection systems constructed in accordance with the invention may be used in conjunction with other forms of detection systems wherein electrical signals representative of defects or characteristics of material under investigation or inspection are produced. Therefore, the invention described herein is not to be construed as limited to the specific embodiment described, but is intended to encompass all modifications thereof coming within the scope of the following claims.

We claim:

1. A detection system having a photomultiplier tube adapted to provide voltage signals when defects occur in a material driven transversely to a path of light emanating from a lamp and impinging on said tube, comprising means responsive to said voltage signals for generating corresponding signals from selected ones of said voltage signals, means responsive to said corresponding signals for generating composite signals the amplitude of which depends on the quantity of said corresponding signals produced in respective preselected periods of time, and means responsive to each of said composite signals for controlling the movement of said material.

2. In a detection system as set forth in claim 1, wherein said corresponding signal generating means is responsive to the amplitude of said voltage signals for generating said corresponding signals.

3. In a detection system as set forth in claim 1, wherein said composite signal generating means stores corresponding signals over a preselected period of time.

4. In a detection system as set forth in claim 1, wherein said controlling means is responsive to the amplitude of said composite signal for controlling the movement of said material.

5. In a detection system as set forth in claim 1, wherein said corresponding signal generating means includes means responsive to the amplitude of each of said voltage signals for controlling the quantity of corresponding signals generated in response thereto.

6. In a detection system as set forth in claim 1, wherein said composite signal generating means includes a current storage device and means periodically connected thereto for discharging said storage device.

7. In a detection system as set forth in claim 6, wherein said controlling means is responsive to the discharge of said storage device.

8. In a detection system as set forth in claim 1, including means responsive to selected ones of said voltage signals for generating signals with amplitudes dependent upon the pulse widths of said selected ones of said voltage signals.

9. In a detection system as set forth in claim 8, wherein said controlling means is responsive to the amplitude of signals generated by said amplitude signal generating means for controlling the movement of said material.

10. A detection system having a photomultiplier tube adapted to provide voltage signals when defects occur in a material driven transversely to a path of light impinging on said tube, comprising means responsive to selected ones of said voltage signals having at least predetermined characteristics for generating corresponding signals, means responsive to each of said corresponding signals for generating a composite signal which depends upon the quantity of said corresponding signals generated in a preselected period of time, means responsive to said corresponding signals for generating respective control signals the amplitude of which depends upon the pulse width of each of said corresponding signals, and means selectively coupled to receive at least one of said generated signals of said composite signal generating means and said control signal generating means and responsive to the amplitude thereof for controlling the movement of said material.

11. In a detection system as set forth in claim 10, wherein said selectively coupled means includes a current-sensitive device for controlling an energizing circuit for moving said material.

12. In a detection system as set forth in claim 11, wherein said current-sensitive device controls an energizing circuit for counting the number of times the movement of said material is stopped.

13. In a detection system as set forth in claim 10, wherein a cathode ray tube is connected to the output of the photomultiplier tube for monitoring said voltage signals.

14. In a detection system as set forth in claim 1, wherein said lamp is disposed with its filament in a horizontal plane relative to the transversely driven material for monitoring defects in said material which are pronounced in a horizontal plane.

15. A detection system having a photomultiplier tube adapted to produce voltage signals when defects occur in ends of yarn traversing the path of light impinging on said tube, comprising means responsive to said voltage signals with at least a preselected amplitude for generating corresponding signals having a pulse width dependent upon the width of respective ones of each of said selected voltage signals, a first signal channel including pulse generating means responsive to said signal generating means for generating a pulse having an amplitude dependent upon the width of a respective one of said corresponding signals to produce a first output signal, a second signal channel including means responsive to said pulse generating means for storing a plurality of signals generated thereby over a preselected period of time to provide a second output signal, and means selectively responsive to said second output signal in said second signal channel and to said first output signal in said first signal channel for controlling the movement of said ends of yarn.

16. In a detection system as set forth in claim 15, wherein said first signal channel includes means responsive to said pulse generating means for generating a sawtooth wave signal the amplitude of which depends on the width of said signals generated by said pulse generating means.

17. The method of monitoring defects in a material by utilizing a light source impinging on a photomultiplier tube displaced therefrom and adapted to provide voltage signals when the light is interrupted comprising the steps of passing the material between the light source and the photomultiplier tube to have defects therein interrupt the light and thereby provide voltage signals, generating control signals from the voltage signals representative of defects with preselected mass, generating composite signals from the control signals representative of the quantity of defects with preselected mass which occur in a preselected period of time, and controlling the movement of the material in accordance with the generated composite signals.

18. The method of monitoring defects in a material by utilizing a light source impinging on a photomultiplier tube displaced therefrom and adapted to provide voltage signals when the light is interrupted comprising the steps of passing the material between the light source and the photomultiplier tube to have defects therein interrupt the light and thereby provide voltage signals, generating control signals from the voltage signals representative of the defects with preselected mass, generating composite signals from the control signals representative of defects occurring within a preselected period of time, and controlling the movement of the material in accordance with the amplitudes of said generated composite signals.

References Cited in the file of this patent

UNITED STATES PATENTS

| | | |
|---|---|---|
| 2,847,162 | Meyer | Aug. 12, 1958 |
| 2,982,860 | Nehrbas | May 2, 1961 |
| 3,001,080 | Neil | Sept. 19, 1961 |
| 3,019,346 | Laycak | Jan. 30, 1962 |
| 3,019,972 | Strother | Feb. 6, 1962 |